United States Patent
Velkur et al.

(10) Patent No.: US 8,984,886 B2
(45) Date of Patent: Mar. 24, 2015

(54) SYSTEMS AND METHODS OF OPERATING A CATALYTIC REFORMING ASSEMBLY FOR USE WITH A GAS TURBINE ENGINE SYSTEM

(75) Inventors: Chetan Babu Velkur, Andhra Pradesh (IN); Hasan Karim, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1041 days.

(21) Appl. No.: 12/704,720

(22) Filed: Feb. 12, 2010

(65) Prior Publication Data

US 2011/0197566 A1  Aug. 18, 2011

(51) Int. Cl.
| | | |
|---|---|---|
| F23R 3/40 | (2006.01) | |
| F02C 9/50 | (2006.01) | |
| B01J 8/02 | (2006.01) | |
| B01J 19/00 | (2006.01) | |
| C01B 3/38 | (2006.01) | |

(Continued)

(52) U.S. Cl.
CPC ............... *F23R 3/40* (2013.01); *B01J 8/0221* (2013.01); *B01J 8/0278* (2013.01); *B01J 8/0285* (2013.01); *B01J 19/002* (2013.01); *C01B 3/386* (2013.01); *F02C 3/205* (2013.01); *F23N 5/242* (2013.01); *B01J 2208/00061* (2013.01); *B01J 2208/00548* (2013.01); *B01J 2208/00902* (2013.01); *B01J 2219/002* (2013.01); *B01J 2219/00213* (2013.01); *B01J 2219/00236* (2013.01); *B01J 2219/00268* (2013.01); *B01J 2219/182* (2013.01); *C01B 2203/0261* (2013.01); *C01B 2203/1619* (2013.01); *C01B 2203/1676* (2013.01); *C01B 2203/84* (2013.01); *F23C 2900/03002* (2013.01); *F23N 2037/12* (2013.01)
USPC .............. 60/723; 60/777; 60/780; 431/7

(58) Field of Classification Search
USPC .............. 60/723, 777, 779, 39.091, 223, 780; 431/7, 328
See application file for complete search history.

(56) References Cited

U.S. PATENT DOCUMENTS

| | | | |
|---|---|---|---|
| 4,033,133 A | | 7/1977 | Houseman et al. |
| 5,729,967 A | * | 3/1998 | Joos et al. .............. 60/39.6 |
| 5,813,222 A | | 9/1998 | Appleby |

(Continued)

FOREIGN PATENT DOCUMENTS

| | | |
|---|---|---|
| JP | 2002282710 A | 10/2002 |
| JP | 2003277006 A | 10/2003 |

(Continued)

OTHER PUBLICATIONS

Unofficial English translation of Japanese Office Action issued in connection with corresponding JP Application No. 2011026621 on Aug. 19, 2014.

*Primary Examiner* — Andrew Nguyen
(74) *Attorney, Agent, or Firm* — Armstrong Teasdale LLP

(57) ABSTRACT

A method for operating a catalytic reforming assembly. The method includes injecting a quantity of oxidizer gas and a quantity of combustion gas into a reformer to form a mixture. The mixture is channeled across a catalyst bed to form a reformate gas stream. A temperature of the catalyst bed is measured using at least one temperature sensor. A level of the oxidizer gas in the reformate stream is measured using at least one oxidizer gas sensor. A health of the catalyst bed is determined based on at least one of a catalyst bed temperature measurement and an oxidizer gas level.

19 Claims, 3 Drawing Sheets

(51) Int. Cl.
*F02C 3/20* (2006.01)
*F23N 5/24* (2006.01)

(56) References Cited

U.S. PATENT DOCUMENTS

| | | |
|---|---|---|
| 5,845,485 A | 12/1998 | Murphy et al. |
| 5,921,076 A | 7/1999 | Krutzsch et al. |
| 6,176,078 B1 | 1/2001 | Balko et al. |
| 6,235,254 B1 | 5/2001 | Murphy et al. |
| 6,702,991 B1 | 3/2004 | Smaling et al. |
| 6,905,998 B2 | 6/2005 | Naka et al. |
| 7,048,897 B1 | 5/2006 | Koripella et al. |
| 7,311,986 B2 | 12/2007 | Hsu |
| 7,591,242 B2 | 9/2009 | Shih et al. |
| 7,980,082 B2 | 7/2011 | Ziminsky et al. |
| 2007/0028625 A1* | 2/2007 | Joshi et al. .................. 60/777 |
| 2008/0113306 A1* | 5/2008 | Veasey et al. .................. 431/6 |
| 2008/0282770 A1* | 11/2008 | Bunce .................. 73/23.31 |

FOREIGN PATENT DOCUMENTS

| | | |
|---|---|---|
| JP | 2004518598 A | 6/2004 |
| JP | 2004531022 A | 10/2004 |
| JP | 2006282471 A | 10/2006 |
| JP | 2009036206 A | 2/2009 |

* cited by examiner

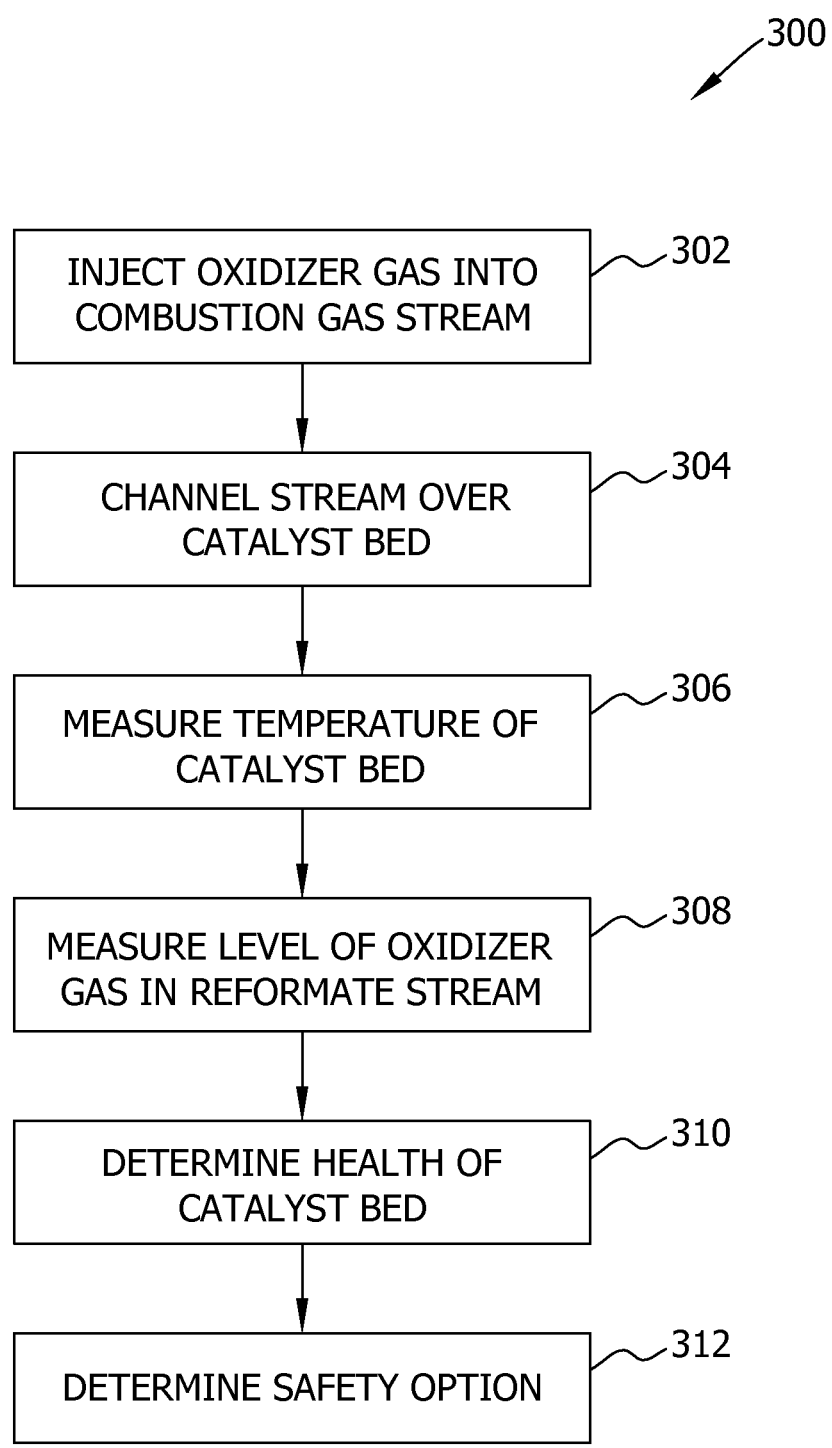

ature sensor. A level of the oxidizer gas in the reformate stream is measured using at least one oxidizer gas sensor. A health of the catalyst bed is determined based on at least one of a catalyst bed temperature measurement and an oxidizer gas level.

SYSTEMS AND METHODS OF OPERATING A CATALYTIC REFORMING ASSEMBLY FOR USE WITH A GAS TURBINE ENGINE SYSTEM

BACKGROUND OF THE INVENTION

The subject matter described herein relates generally to hydrocarbon reforming for generating hydrogen, and more particularly, to a system and method for use in monitoring a catalyst and a reformate stream within a catalytic reforming assembly.

Doping of a hydrocarbon, such as methane, with hydrogen generally improves the turndown capability of a gas turbine and enables the turbine to power less than full loads more efficiently. However, often storing and transporting the hydrogen may be difficult, which promotes in-situ generation of hydrogen, i.e. generation of hydrogen at the location of the gas turbine.

One known method used to generate hydrogen involves reforming hydrocarbons, such as methane, using a catalytic reforming assembly. A controlled molar quantity of a hydrocarbon feed stream, such as methane, and a controlled molar quantity of an oxidizer stream, such as oxygen ($O_2$), are channeled over a catalyst to create a hydrogen rich reformate gas stream. However, if the catalyst is not performing efficiently then some oxygen may flow through the system without being catalyzed. Such a condition is referred to as oxygen slip and may cause premature ignition of the reformate gas stream. Generally, catalytic reforming assemblies are equipped with hardware that continuously measures and controls the flow rate of methane and oxidizer to the catalyst. Moreover, one or more spray nozzles are provided to mix the methane and oxidizer upstream of the catalyst in an attempt to control the proper molar proportions of methane and oxidizer to the catalyst to avoid oxygen slip.

The reactivity of a catalyst can degrade over time. Known reformer systems use temperature sensors to determine the temperature of a catalyst as an indicator of the operating effectiveness of the catalyst. In such systems, if the temperature of the catalyst falls below a predetermined threshold, often this is an indication that the reformer system needs maintenance, such as a refreshing or a replacement of the catalyst. Such maintenance often requires shutdown of the reformer system. Other known reformer systems may supplement the catalytic function using a plasma arc, for example, when the temperature of the catalyst falls below the predetermined threshold, or otherwise indicates a decreased performance of the catalytic reforming assembly.

BRIEF DESCRIPTION OF THE INVENTION

In one aspect, a method for operating a catalytic reforming assembly is provided. The method includes injecting a quantity of oxidizer gas and a quantity of combustion gas into a reformer to form a mixture. The mixture is channeled across a catalyst bed to form a reformate gas stream. A temperature of the catalyst bed is measured using at least one temperature sensor. A level of the oxidizer gas in the reformate stream is measured using at least one oxidizer gas sensor. A health of the catalyst bed is determined based on at least one of a catalyst bed temperature measurement and an oxidizer gas level.

In another aspect, a catalytic reforming assembly for use with a gas turbine engine system is provided. The catalytic reforming assembly includes a catalytic reformer coupled in flow communication with a combustion gas source for channeling a flow of combustion gas to the catalytic reformer. The catalytic reformer includes a catalyst bed. At least one injector is coupled to the catalytic reformer for injecting a quantity of an oxidizer gas into the catalytic reformer to form a mixture including at least one of the oxidizer gas and the combustion gas. The mixture is channeled across the catalyst bed to form a reformate stream. At least one temperature sensor is coupled to the catalytic reformer for measuring a temperature of the catalyst bed. At least one oxidizer gas sensor is coupled to the catalytic reformer for measuring a level of the oxidizer gas in the reformate stream. A controller is coupled to the temperature sensor and to the oxidizer gas sensor. The controller is configured to determine a health of the catalyst bed based on at least one of a catalyst bed temperature and an oxidizer gas level.

In yet another aspect, a gas turbine engine system is provided. The gas turbine engine system includes a compressor, a combustor in flow communication with the compressor to receive at least some of the air discharged by the compressor, and a catalytic reforming assembly coupled in flow communication with the combustor. The catalytic reforming assembly includes a catalytic reformer coupled in flow communication to a combustion gas source for channeling a flow of combustion gas to the catalytic reformer. The catalytic reformer comprising at least one catalyst bed. At least one injector is coupled to the catalytic reformer for injecting a quantity of an oxidizer gas into the catalytic reformer to form a mixture including at least one of the oxidizer gas and the combustion gas. The mixture is channeled across the catalyst bed to form a reformate stream. At least one temperature sensor is coupled to the catalytic reformer for measuring a temperature of the catalyst bed. At least one oxidizer gas sensor is coupled to the catalytic reformer for measuring a level of the oxidizer gas in the reformate stream. A controller is coupled to the temperature sensor and to the oxidizer gas sensor. The controller is configured to determine a health of the catalyst bed based on at least one of a catalyst bed temperature and an oxidizer gas level.

BRIEF DESCRIPTION OF THE DRAWINGS

FIG. 3 is a flow chart of an exemplary method of operating the catalytic reformer assembly shown in FIG. 2.

DETAILED DESCRIPTION OF THE INVENTION

The present application describes a method and system for use in preventing the failure of a catalytic reforming assembly. A catalyst used in a catalyst bed in a hydrocarbon reforming assembly can degrade over a period of time. When a reforming assembly uses an oxidizer gas which, if not fully catalyzed, can adversely affect the performance and safe operation of a turbine, a system that monitors the catalyst bed and the reformate stream is beneficial in avoiding these unsafe and adverse effects. As such, the present application describes a system that monitors the temperature of the catalyst bed as well as the level of non-catalyzed oxidizer gas present in the reformate stream downstream of the catalyst bed. Based on the temperature and/or the level of oxidizer gas in the reformate stream, a corrective safety action is performed.

Figure 1:
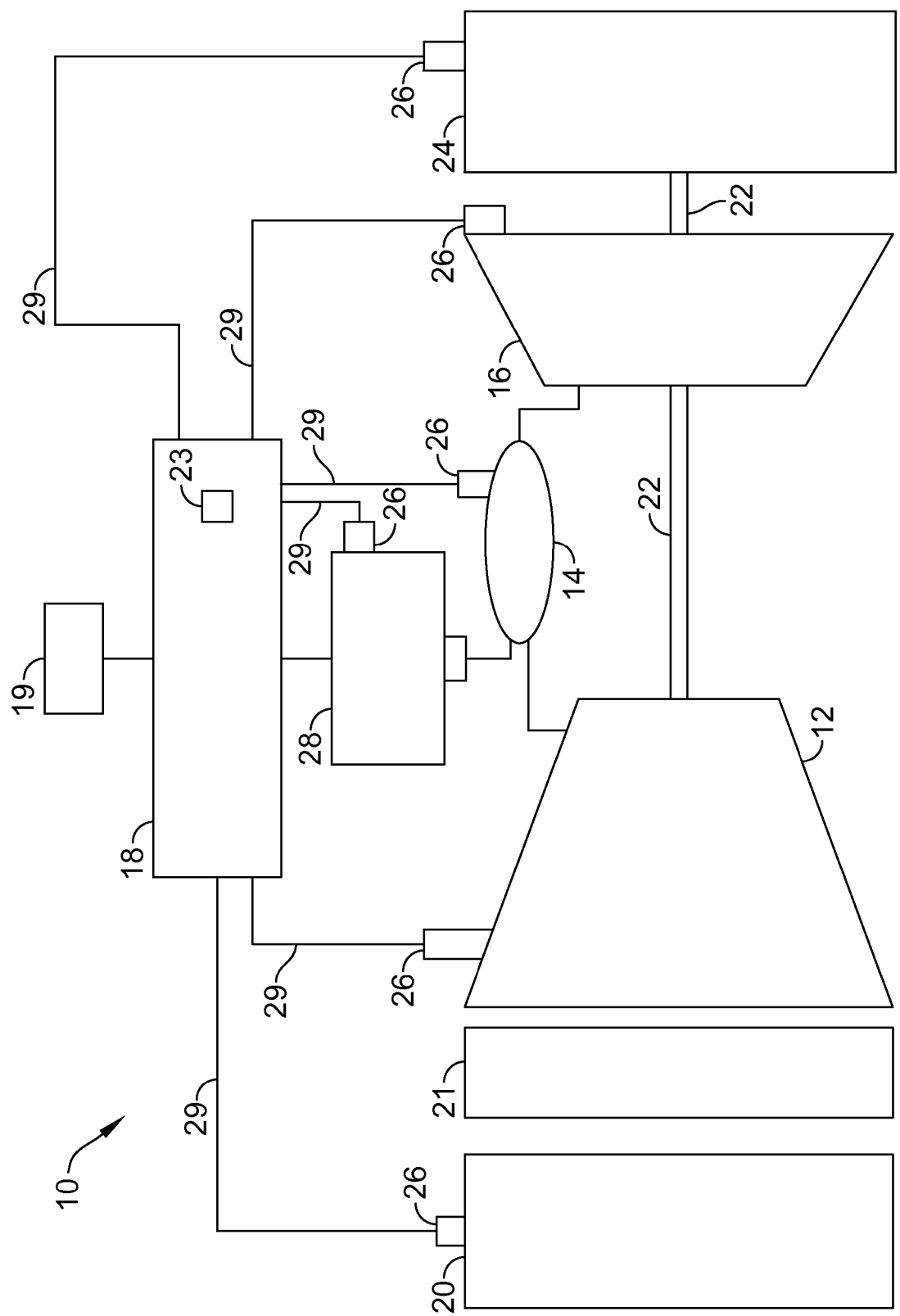
FIG. 1 is a schematic illustration of an exemplary gas turbine engine system.

FIG. 1 is a schematic diagram of a gas turbine engine system 10. In the exemplary embodiment, gas turbine engine system 10 includes a compressor 12, a combustor 14, a turbine 16 drivingly coupled to compressor 12 via a rotor shaft 22, a control system or controller 18, and a catalytic reforming assembly 28. Combustor 14 is coupled to compressor 12 such that combustor 14 is in flow communication with compressor 12. Catalytic reforming assembly 28 is coupled to combustor 14 and is configured to channel fuel into combustor 14. An inlet duct 20 channels ambient air to compressor 12. In one embodiment, injected water and/or other humidifying agents are also channeled to compressor 12 through inlet duct 20. Inlet duct 20 may include multiple ducts, filters, screens and/or sound-absorbing devices that contribute to pressure losses of ambient air flowing through inlet duct 20 into one or more inlet guide vanes 21 of compressor 12.

During operation, inlet duct 20 channels air towards compressor 12 that compresses the inlet air to higher pressures and temperatures. Compressor 12 discharges compressed air towards combustor 14 wherein it is mixed with fuel and ignited to generate combustion gases that flow to turbine 16, which drives compressor 12. Combustor 14 channels combustion gases to turbine 16 wherein gas stream thermal energy is converted to mechanical rotational energy.

In the exemplary embodiment, gas turbine engine system 10 may be used to drive a load 24, such as a generator coupled to rotor shaft 22. In an alternative embodiment, generator 24 may be coupled to a forward extension (not shown) of rotor shaft 22.

The operation of gas turbine engine system 10 may be monitored by several sensors 26 that detect various conditions of turbine 16, generator 24, catalytic reforming assembly 28, and/or ambient environment. Sensors 26 may also include gas sensors, temperature sensors, flow sensors, speed sensors, flame detector sensors, valve position sensors, guide vane angle sensors, and/or other sensors that sense various parameters relative to the operation of gas turbine engine system 10. As used herein, the term "parameters" refers to physical properties whose values can be used to define the operating conditions of gas turbine engine system 10, such as temperatures, pressures, and gas flows at defined locations.

In the exemplary embodiment, control system 18 communicates with sensors 26 via communication links 29, which may be implemented in hardware and/or software. In one embodiment, communication links 29 remotely communicate data signals to and from control system 18 in accordance with any wired or wireless communication protocol known to one of ordinary skill in the art guided by the teachings herein. Such data signals may include signals indicative of operating conditions of sensors 26 transmitted to the control system 18 and various command signals communicated by control system 18 to sensors 26.

Control system 18 may be a computer system that includes a display 19 and at least one processor 23. Control system 18 executes programs to control the operation of gas turbine engine system 10 using sensor inputs and instructions from human operators. User input functionality is provided in display 19, which acts as a user input selection device. In the exemplary embodiment, display 19 is responsive to the user pressing contact on display 19 to selectively perform functionality. Display 19 may also include a keypad which operates in a conventional well known manner. Thus, the user can operate desired functions available with control system 18 by contacting a surface of display 19.

In the embodiments described herein, memory may include, without limitation, a computer-readable medium, such as a random access memory (RAM), and a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). The execution of sequences of instructions is not limited to any specific combination of hardware circuitry and software instructions.

Figure 2:
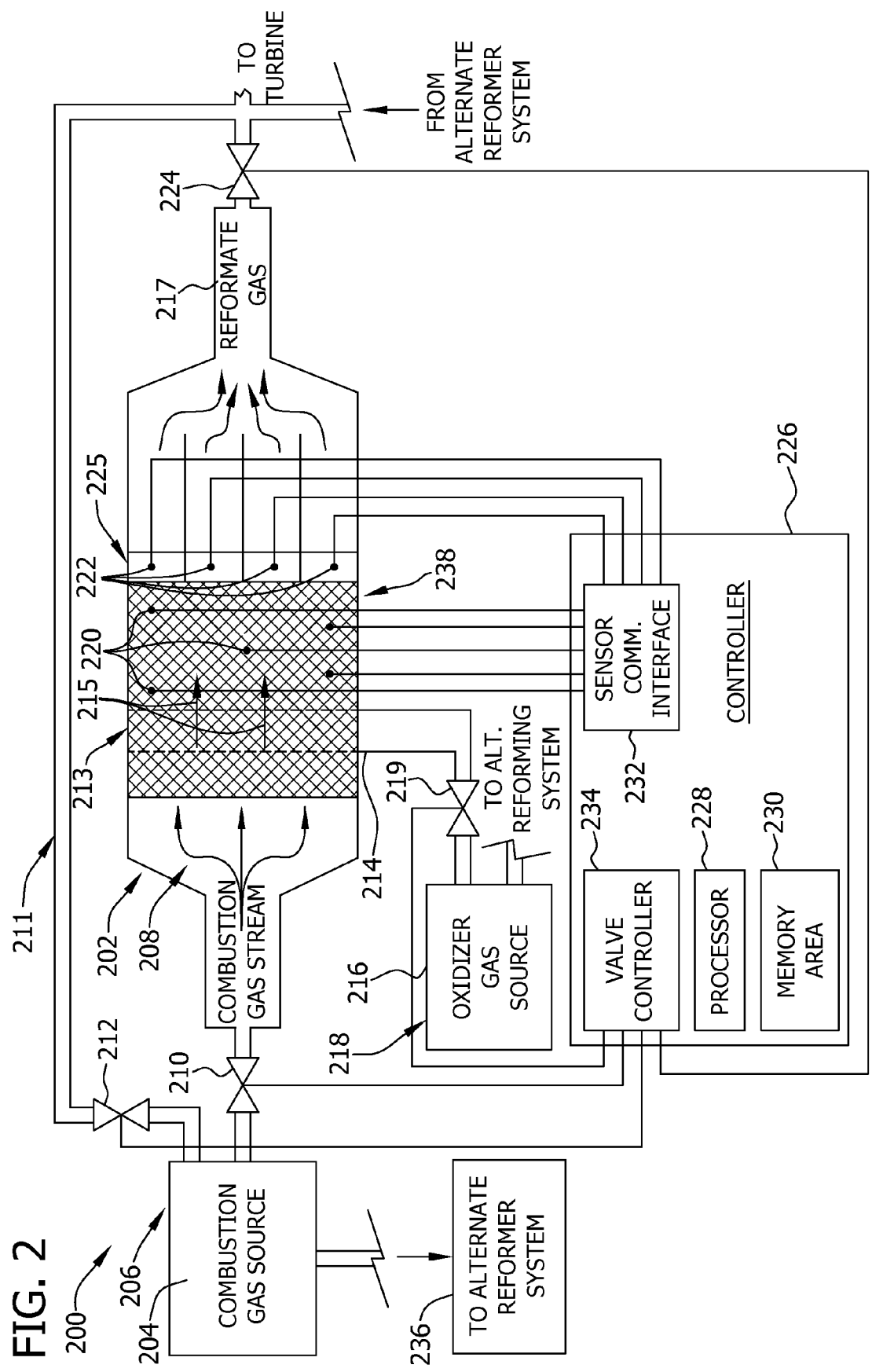
FIG. 2 is a block diagram illustrating an exemplary catalytic reformer assembly for use with the gas turbine engine system shown in FIG. 1.

FIG. 2 is a block diagram illustrating an exemplary catalytic reforming assembly 200 for use in gas turbine engine system 10. In the exemplary embodiment, catalytic reforming assembly 200 is configured to facilitate preventing a failure of a catalytic reformer 202 that is used for reforming a combustion gas 204 from a combustion source 206. Catalytic reforming assembly 200 includes at least one catalytic reformer 202 coupled in flow communication with a combustion gas source 206 for channeling a combustion gas 204 to catalytic reformer 202. A combustion gas source valve 210 is positioned between catalytic reformer 202 and combustion gas source 206 for controlling a flow of combustion gas 204. A reformer system bypass conduit 211 is coupled in flow communication with combustion gas source 206 and an alternate reformer system 236. A bypass valve 212 is coupled to reformer system bypass conduit 211 and is positioned between combustion gas source 206 and alternate reformer system 236 for controlling a flow of combustion gas source 206 to alternate reformer system 236. An oxidizer gas source 218 is coupled in flow communication with catalytic reformer 202 for channeling an oxidizer gas 216 to catalytic reformer 202. The quantity of combustion gases 204 channeled in a combustion gas stream 208 is controlled via combustion gas source valve 210, and the quantity of combustion gases 204 in reformer system bypass conduit 211 is controlled via bypass valve 212. In the exemplary embodiment, the combustion gases 204 include methane. In alternative embodiments, the combustion gases 204 may include any suitable gases that enable catalytic reformer 202 to function as described herein. Moreover, in the exemplary embodiment, combustion gas stream 208 flows through valve 210 into catalytic reformer 202. Catalytic reformer 202 includes a catalyst bed 213 and a catalyzing material 238 positioned within catalyst bed 213. At least one oxidizer gas injector 214 is coupled in flow communication with catalytic reformer 202 and with oxidizer gas source 218 for injecting oxidizer gas 216 from oxidizer gas source 218 into catalytic reformer 202 such that oxidizer gas 216 is mixed with combustion gas stream 208 to form a mixture 215 that includes at least one of a portion of oxidizer gas 216 and combustion gas stream 208. Catalytic reformer 202 channels mixture 215 over catalyst bed 213 to produce a reformate gas 217 via catalysis. In the exemplary embodiment, the quantity of oxidizer gas 216 is controlled via an oxidizer gas source valve 219. In such an exemplary embodiment, oxidizer gas 216 includes substantially pure oxygen. In alternative embodiments, oxidizer gas 216 may include any suitable gas that may be used with combustion gas 204 to enable catalysis in catalytic reformer 202 as described herein. Moreover, in the exemplary embodiment, oxidizer gas injector 214 includes a grid of injectors that are substantially evenly spaced across catalyst bed 213 to enable oxidizer gas 216 to be injected substantially evenly across catalyst bed 213 to facilitate improving catalyzing efficiency.

Catalytic reforming assembly 200 further includes at least one temperature sensor 220 positioned in catalyst bed 213 to measure a temperature of catalyst bed 213. In the exemplary embodiment, temperature sensor 220 is a thermocouple. In other embodiments, temperature sensor 220 may be any suitable sensor that enables catalytic reforming assembly 200 to function as described herein. In one embodiment, catalytic reforming assembly 200 includes only a single temperature sensor 220 positioned in catalyst bed 213. In the exemplary embodiment, catalytic reforming assembly 200 includes a plurality of temperature sensors 220 positioned in a matrix in catalyst bed 213 to measure temperature at multiple points throughout catalyst bed 213. Catalytic reforming assembly 200 also includes at least one oxidizer gas sensor 222 to measure a level of oxidizer gas 216 in reformate gas 217 downstream from catalyst bed 213. In one embodiment, a single oxidizer gas sensor 222 is positioned upstream of a reformate gas valve 224. In the exemplary embodiment, catalytic reforming assembly 200 includes a plurality of oxidizer gas sensors 222 positioned at a plurality of different locations across an exit plane 225 of catalyst bed 213 to measure the level of oxidizer gas 216 in reformate gas 217 at a plurality of different locations.

Moreover, in the exemplary embodiment, catalytic reforming assembly 200 includes a controller 226 that includes a processor 228, a memory area 230, a sensor communication interface 232 that is coupled to temperature sensors 220 and oxidizer gas sensors 222, and a valve controller 234 that is communicatively coupled to valves 210, 212, 219, and 224 to control the flow of combustion gas 204 through valve 210, the flow of combustion gas 204 through valve 212 to reformer system bypass conduit 211, the flow of oxidizer gas 216 through valve 219, and the flow of reformate gas 217 through valve 224. In the exemplary embodiment, controller 226 receives a signal from temperature sensor(s) 220 that is indicative of the temperature measured by temperature sensor(s) 220 in catalyst bed 213, and receives a signal from oxidizer gas sensor(s) 222 that is indicative of the level of oxidizer gas 216 in the stream of reformate gas 217 downstream of catalyst bed 213 after catalysis. Moreover, in the exemplary embodiment, controller 226 determines the health of catalyst bed 213 based on the measured temperature(s) obtained from temperature sensor(s) 220 and/or measured level(s) of oxidizer gas 216 obtained from oxidizer gas sensor(s) 222. In the exemplary embodiment, the health of catalyst bed 213 is determined to be negatively impacted if the measured temperature from temperature sensor(s) 220 is less than a pre-determined safety threshold, and/or if the measured level of oxidizer gas 216 from oxidizer gas sensor(s) 222 is greater than a pre-determined safety threshold. In the exemplary embodiment, upon determining the health of catalyst bed 213, controller 226 determines a safety option for catalytic reforming assembly 200 based on the determined health.

In the exemplary embodiment, safety options include, but are not limited to only including, either redirecting combustion gas 204 and/or oxidizer gas 216 to an alternate catalytic reforming assembly and/or an alternate catalyst bed. In another embodiment, the safety options also include bypassing catalytic reformer 202 in the catalytic reforming assembly 200 using bypass conduit 211 to enable gas turbine engine system 10 to operate using combustion gases 204 without using reformate gas 217, and without any potential adverse effects caused by reformate gas 217 at a level of oxidizer gas 216 which may be unsafe for gas turbine engine system 10. In other embodiments, the safety options include replacing, adjusting, and/or renewing the catalyzing material 238 in catalyst bed 213 to facilitate improving the temperature of catalyst bed 213 and the level of oxidizer gas 216 in reformate gas 217. In yet another embodiment, the safety options include adjusting the injected quantity of oxidizer gas 216 and/or adjusting the quantity of combustion gas 204 by either increasing or decreasing the quantities to facilitate improving the temperature of catalyst bed 213 and the level of oxidizer gas 216 in reformate gas 217. Moreover, in another embodiment, the safety options include adjusting the quantity of the injected oxidizer gas 216 and/or the quantity of combustion gases 204 at different locations within catalyst bed 213 based on the measured temperature(s) of catalyst bed 213, the measured level(s) of oxidizer gas 216 downstream from catalyst bed 213, and/or the determined health of catalyst bed 213. Adjusting the quantity of injected oxidizer gas 216 at different locations based on temperature and oxidizer gas 216 levels from those different locations enables catalytic reforming assembly 200 to increase or decrease the catalysis process output at those locations based on the health of those locations, and facilitates extending the useful life of, and the length of time that, catalyst bed 213 can operate without triggering a safety option determination.

FIG. 3 is a flow chart of an exemplary method 300 of operating catalytic reforming assembly 200 for use in preventing the failure of catalytic reformer 202. In the exemplary embodiment, method 300 includes injecting 302 a quantity of oxidizer gas 216 into the combustion gas stream 208 to form mixture 215 and channeling 304 the mixture 215 past and over catalyst bed 213 to facilitate a reaction between combustion gas stream 208 and oxidizer gas 216 such that a reformate gas 217 is formed. Moreover, in the exemplary embodiment, method 300 also includes measuring 306 a temperature of the catalyst bed 213 using at least one temperature sensor 220 positioned in catalyst bed 213, and measuring 308 a level of oxidizer gas 216 in reformate gas 217 downstream from catalyst bed 213. Further, in the exemplary embodiment, method 300 includes determining 310 the health of the catalyst bed 213 based on the measured temperature of catalyst bed 213 and/or based on the measured level of oxidizer gas 216 in the reformate gas 217 downstream from catalyst bed 213. In addition, a safety option for catalytic reformer 202 is determined 312 based on the determined health of the catalyst bed 213.

In the exemplary embodiment, method 300 also includes measuring 306 the temperature of catalyst bed 213 using a plurality of temperature sensors 220 positioned in catalyst bed 213, and measuring 308 the level of oxidizer gas 216 in reformate gas 217 downstream from catalyst bed 213 at a plurality of different locations relative to the catalyst bed 213. In alternative embodiments, the temperature of catalyst bed 213 and the level of oxidizer gas 216 are each measured 308 using a single sensor. Moreover, in the exemplary embodiment, the health of the catalyst bed 213 is determined 310 to be negatively impacted when the catalytic reforming assembly 200 determines that the measured temperature of the catalyst bed 213 is less than a pre-determined safety threshold and/or determines that the measured level of oxidizer gas 216 is greater than a pre-determined safety threshold. In an alternative embodiment, the quantity of at least one of the injected oxidizer gas 216 and the combustion gas 204 are adjusted at different locations of catalyst bed 213 in accordance with the measured 306 temperature and/or measured 308 level of oxidizer gas 216, and/or the determined health 310.

The above-described systems and methods facilitate operating a catalytic reforming assembly to prevent a failure of a catalytic reformer. As such, the embodiments described herein facilitate monitoring the catalytic reformer and perform corrective safety action to prevent oxidizer gas slip and premature ignition of the reformate gas stream. Specifically, the catalytic reforming assembly facilitates monitoring a temperature of a catalyst bed and a level of non-catalyzed oxidizer gas present in a reformate stream and takes corrective safety action based on various measurements to reduce and/or avoid the problems caused oxidizer gas that is not fully catalyzed. As such, the cost of maintaining the gas turbine engine system is facilitated to be reduced.

Exemplary embodiments of systems and methods of operating a catalytic reforming assembly for use with a gas turbine engine system are described above in detail. The systems and methods are not limited to the specific embodiments described herein, but rather, components of systems and/or steps of the method may be utilized independently and separately from other components and/or steps described herein. For example, the systems and method may also be used in combination with other combustion systems and methods, and are not limited to practice with only the gas turbine engine system as described herein. Rather, the exemplary embodiment can be implemented and utilized in connection with many other combustion system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a catalytic reforming assembly, said method comprising:
    injecting a quantity of oxidizer gas and a quantity of combustion gas into a reformer to form a mixture;
    channeling the mixture across a catalyst bed to form a reformate gas stream;
    measuring a temperature at a plurality of points throughout the catalyst bed using a plurality of temperature sensors;
    measuring a level of the oxidizer gas in the reformate stream using a plurality of oxidizer gas sensors positioned at a plurality of exit-plane locations across an exit plane of the catalyst bed; and
    determining a health of the catalyst bed at each of a plurality of bed locations of the catalyst bed based on a measured temperature at a corresponding point of the plurality of points and a measured level of the oxidizer gas at a corresponding downstream location of the plurality of exit-plane locations; and
    adjusting a quantity of oxidizer gas injected at each of the plurality of bed locations based on the determined health of those locations.

2. A method in accordance with claim 1 further comprising determining a safety option for the catalytic reforming assembly based on the health determination of the catalyst bed.

3. A method in accordance with claim 1 further comprising redirecting at least one of the combustion gas and the oxidizer gas to at least one of an alternate catalytic reforming assembly and an alternate catalyst bed based on the health determination.

4. A method in accordance with claim 1 further comprising bypassing the catalytic reforming assembly based on the health determination.

5. A catalytic reforming assembly for use with a gas turbine engine system, said catalytic reforming assembly comprising:
    a catalytic reformer coupled in flow communication with a combustion gas source for channeling a flow of combustion gas to said catalytic reformer, said catalytic reformer comprising a catalyst bed;
    at least one injector coupled to said catalytic reformer for injecting a quantity of an oxidizer gas into said catalytic reformer to form a mixture including at least one of the oxidizer gas and the combustion gas, said mixture is channeled across said catalyst bed to form a reformate stream;
    a plurality of temperature sensors, each temperature sensor is coupled at one of a plurality of points throughout said catalytic reformer for measuring a temperature of said catalyst bed at each of said plurality of points;
    a plurality of oxidizer gas sensors positioned at a plurality of exit-plane locations across an exit plane of said catalyst bed and coupled to said catalytic reformer for measuring a level of the oxidizer gas at each of said plurality of exit-plane locations in said reformate stream; and
    a controller coupled to said plurality of temperature sensors and to said plurality of oxidizer gas sensors, said controller configured to determine a health of said catalyst bed at each of a plurality of bed locations of said catalyst bed based on a measured temperature at a corresponding point of said plurality of points and a measured level of the oxidizer gas at a corresponding downstream location of said plurality of exit-plane locations and adjust a quantity of oxidizer gas injected at each of the plurality of bed locations based on the determined health of those locations.

6. A catalytic reforming assembly in accordance with claim 5, wherein said controller is further configured to determine a safety option for the catalytic reforming assembly based on the health determination of said catalyst bed.

7. A catalytic reforming assembly in accordance with claim 5, wherein said controller is further configured to cause at least one of the combustion gas and the oxidizer gas to be redirected to at least one of an alternate catalytic reforming assembly and an alternate catalyst bed based on the health determination.

8. A catalytic reforming assembly in accordance with claim 5, wherein said controller is further configured to cause said catalytic reforming assembly to be bypassed based on the health determination.

9. A catalytic reforming assembly in accordance with claim 5, wherein said controller is further configured to cause adjusting the quantity of the combustion gas based on the health determination.

10. A gas turbine engine system comprising:
a compressor;
a combustor in flow communication with said compressor to receive at least some of the air discharged by said compressor; and
a catalytic reforming assembly coupled in flow communication with said combustor, said catalytic reforming assembly comprising:
a catalytic reformer coupled in flow communication to a combustion gas source for channeling a flow of combustion gas to said catalytic reformer, said catalytic reformer comprising at least one catalyst bed;
at least one injector coupled to said catalytic reformer for injecting a quantity of an oxidizer gas into said catalytic reformer to form a mixture including at least one of the oxidizer gas and the combustion gas, said mixture is channeled across said catalyst bed to form a reformate stream;
a plurality of temperature sensors, each temperature sensor is coupled at one of a plurality of points throughout said catalytic reformer for measuring a temperature of said catalyst bed at each of said plurality of points;
a plurality of oxidizer gas sensors positioned at a plurality of exit-plane locations across an exit plane of said catalyst bed and coupled to said catalytic reformer for measuring a level of the oxidizer gas at each of said plurality of exit-plane locations in said reformate stream; and
a controller coupled to said plurality of temperature sensors and to said plurality of oxidizer gas sensors, said controller configured to determine a health of said catalyst bed at each of a plurality of bed locations of said catalyst bed based on a measured temperature at a corresponding point of said plurality of points and a measured level of the oxidizer gas at a corresponding downstream location of said plurality of exit-plane locations and adjust a quantity of oxidizer gas injected at each of the plurality of bed locations based on the determined health of those locations.

11. A gas turbine engine system in accordance with claim 10, wherein said controller is further configured to determine a safety option for said catalytic reforming assembly based on the health determination of said catalyst bed.

12. A gas turbine engine system in accordance with claim 10, wherein said controller is further configured to cause at least one of the combustion gas and the oxidizer gas to be redirected to at least one of an alternate catalytic reforming assembly and an alternate catalyst bed based on the health determination.

13. A gas turbine engine system in accordance with claim 10, wherein said controller is further configured to cause the catalytic reforming assembly to be bypassed based on the health determination.

14. A method in accordance with claim 1, wherein the quantity of oxidizer gas is injected using a grid of injectors that are spaced across the catalyst bed, each of the plurality of bed locations receives oxidizer gas from a corresponding injector of the grid of injectors, said method further comprising adjusting the quantity of the oxidizer gas injected by the corresponding injector based on the measured temperature at the corresponding point of the plurality of points and the measured level of the oxidizer gas at the corresponding downstream location of the plurality of exit-plane locations.

15. A method in accordance with claim 1, wherein a negative health at each of the plurality of bed locations is determined by at least one of a determination that the measured temperature at the corresponding point of the catalyst bed is less than a pre-determined safety threshold, and a determination that the measured level of the oxidizer gas at the corresponding downstream location of the plurality of exit-plane locations is greater than a pre-determined safety threshold.

16. A catalytic reforming assembly in accordance with claim 5, wherein said at least one injector comprises a grid of injectors that are spaced across said catalyst bed, each of said plurality of bed locations receives oxidizer gas from a corresponding injector of said grid of injectors, wherein said controller is further configured to adjust the quantity of the oxidizer gas injected by said corresponding injector based on the measured temperature at said corresponding point of said plurality of points and the measured level of the oxidizer gas at said corresponding downstream location of said plurality of exit-plane locations.

17. A catalytic reforming assembly in accordance with claim 5, wherein a negative health at each of said plurality of bed locations is determined by at least one of a determination that the measured temperature at said corresponding point of said catalyst bed is less than a pre-determined safety threshold, and a determination that the measured level of the oxidizer gas at said corresponding downstream location of said plurality of exit-plane locations is greater than a pre-determined safety threshold.

18. A gas turbine engine system in accordance with claim 10, wherein said at least one injector comprises a grid of injectors that are spaced across said catalyst bed, each of said plurality of bed locations receives oxidizer gas from a corresponding injector of said grid of injectors, wherein said controller is further configured to adjust the quantity of the oxidizer gas injected by said corresponding injector based on the measured temperature at said corresponding point of said plurality of points and the measured level of the oxidizer gas at said corresponding downstream location of said plurality of exit-plane locations.

19. A gas turbine engine system in accordance with claim 10, wherein a negative health at each of said plurality of bed locations is determined by at least one of a determination that the measured temperature at said corresponding point of said catalyst bed is less than a pre-determined safety threshold, and a determination that the measured level of the oxidizer gas at said corresponding downstream location of said plurality of exit-plane locations is greater than a pre-determined safety threshold.

* * * * *